United States Patent [19]

Wang

[11] Patent Number: 5,030,707

[45] Date of Patent: * Jul. 9, 1991

[54] POLYCARBONATE POLYMER HAVING SPIRODILACTAM MOIETIES

[75] Inventor: Pen-Chung Wang, Houston, Tex.

[73] Assignee: Shell Oil Company, Houston, Tex.

[*] Notice: The portion of the term of this patent subsequent to Mar. 6, 2007 has been disclaimed.

[21] Appl. No.: 411,775

[22] Filed: Sep. 25, 1989

[51] Int. Cl.$^5$ .............................................. C08G 64/12
[52] U.S. Cl. ................................... 528/203; 528/196; 528/201; 528/204; 528/323
[58] Field of Search ............... 528/201, 196, 203, 204, 528/323

[56] References Cited

U.S. PATENT DOCUMENTS 4,594,404  6/1986  Kawakami et al. ................. 528/174
4,906,725  3/1990  Wang ................................... 528/201

OTHER PUBLICATIONS

"Webster's Ninth New Collegiate Dictionary," pp. 830–831, Merriam–Webster Inc., Springfield, Mass. (1983).

Schnell, *Industrial and Engineering Chemistry*, 51(2), pp. 157–160 (1960).

*Primary Examiner*—Harold D. Anderson

[57] ABSTRACT

Novel polycarbonate polymers comprise regular, alternating units of (a) a 1,6-diaza [4.4] spirodilactam having oxyaryl substituents on each spiro ring nitrogen atom and (b) a di(oxyphenyl) compound, the units being separated by carbonyl groups. The regular, alternating polycarbonate polymers exhibit improved hydrolytic stability.

16 Claims, No Drawings

POLYCARBONATE POLYMER HAVING SPIRODILACTAM MOIETIES

FIELD OF THE INVENTION

This invention relates to certain novel polycarbonate polymers. More particularly, the invention relates to polycarbonate polymers having regular, alternating moieties of a 1,6-diaza [4.4] spirodilactam with an oxyaryl substituent on each spiro ring nitrogen atom, and a di(oxyphenyl) compound, the alternating moieties being separated by carbonyl groups.

BACKGROUND OF THE INVENTION

The class of polycarbonate polymers is broadly known in the art. An early review article by Schnell, *Industrial and Engineering Chemistry*, Vol. 51, No. 2, pp 157-160 (1960) describes properties of the class of polycarbonates and methods known in the art at that time for the production of polycarbonate polymers including certain polycarbonate polymers which are now commercial. In general, the polycarbonates are thermoplastics whose glass transition temperatures will depend upon the nature and the symmetry of the groups incorporated into the polycarbonate chain other than the carbonyldioxy groups. Most polycarbonates are derived from a bisphenol and commercial polycarbonates are derived from a 2,2-di(4-hydroxyphenyl)propane, also known as bisphenol A or BPA. The polycarbonate polymers are conventionally produced by reaction of a bisphenol or an alkali metal salt thereof with phosgene or by ester exchange with a diaryl carbonate, particularly diphenyl carbonate.

These polymers are processed by conventional methods employed for thermoplastics such as injection molding or extrusion into films, sheets, fibers, tubing and shaped articles. The articles produced from polycarbonate polymers demonstrate good resistance to oxygen, heat and light as well as resistance to common solvents.

The properties of many thermoplastics is raised by the incorporation of cyclic structures or additional cyclic structures within the polymer chain. One such class of polycarbonate polymers is described and claimed by copending U.S. patent application Ser. No. 279,671, filed Dec. 5, 1988, now U.S. Pat. No. 4,906,725. This application claims an alternating polycarbonate polymer wherein moieties of an oxyaryl-substituted spirodilactam, i.e., a 1,6-di(oxyaryl)-1,6-diazaspiro[4.4]nonane-2,7-dione, alternate with carbonyl moieties. In an optional embodiment, a portion of the moiety derived from the spirodilactam bisphenol is replaced with a moiety derived from a di(hydroxyphenyl)alkane such as BPA. The polymers are produced by the conventional reaction of phosgene or diaryl carbonate with the bisphenol(s) or alkali metal salts thereof. In the polymers of this copending application Ser. No. 279,671, moieties of bisphenol alternate with carbonyl moieties. However, in the embodiment where moieties of two bisphenols are present, the relationship of the two bisphenol moieties is random. It would be of advantage to provide polycarbonate polymers of mixed bisphenol moieties wherein the relationship of the bisphenol moieties is regular and alternating. Such polymers are known to have greater hydrolytic stability than polycarbonate polymers having a random arrangement of bisphenol structures. See U.S. Pat. No. 4,595,404, for example.

SUMMARY OF THE INVENTION

This invention provides a class of novel polycarbonate polymers having moieties illustratively derived from two bisphenols. More particularly, the invention provides a class of polycarbonate polymers having regular alternating moieties of (a) an oxyaryl-substituted spirodilactam having an oxyaryl substituent on each spiro ring nitrogen atom and (b) a di(oxyphenyl) compound, the regular alternating moieties being separated by carbonyl groups. Such polycarbonate polymers of regular, alternating bisphenol moieties have an improved hydrolytic stability.

DESCRIPTION OF THE INVENTION

The novel polycarbonate polymers of the invention are produced by reaction of a bisphenol or alkali metal salt thereof with a dihaloformate derivative of a second bisphenol. The bisphenol from which the spirodilactam moieties of the polycarbonate polymers of the invention are derived is a 1,6-diazaspiro[4.4]nonane-2,7-dione having hydroxyaryl substituents on each spiro ring nitrogen atom. The preferred spirodilactam source of spirodilactam moieties has up to 60 carbon atoms inclusive, is substituted on each spiro ring nitrogen atom with a hydroxyaryl substituent and is optionally substituted in other spiro ring positions with cyclic or acyclic substituents. One class of such spirodilactams is represented by the formula

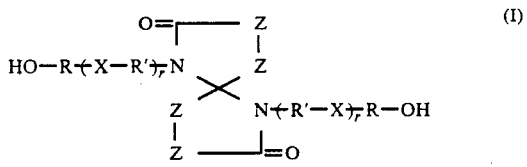

wherein Z independently is

in which Z' independently is hydrogen, lower alkyl of up to 4 carbon atoms inclusive, preferably methyl, halogen, preferably the lower halogens fluoro or chloro, or aryl preferably phenyl, or Z is such that two adjacent Z groups form a ring system Z" of from 5 to 7 ring atoms inclusive up to 2 of which are heteroatoms selected from nitrogen, oxygen or sulfur with the remaining ring atoms being carbon atoms, there being up to 15 carbon atoms in each Z", two of which form a bridge between the carbon atoms connected by the adjacent Z groups. In the above formula I, R independently is aromatic of up to 15 carbon atoms and from 1 to 2 aromatic rings, inclusive, R' independently is R or aliphatic of up to 10 carbon atoms inclusive, r independently is 0 or 1 and X independently is a direct valence bond, alkylene of up to 8 carbon atoms inclusive, oxy, thio, carbonyl, sulfonyl, dioxyphenylene, 2,2-di(oxyphenyl)-propane, di(oxyphenyl) sulfone and dioxydiphenylene. The R, R' and X groups are otherwise hydrocarbyl containing only atoms of carbon and hydrogen besides any additional atoms present as divalent linking groups or are substituted hydrocarbyl additionally containing other atoms present as monovalent carbon atom substituents such as halogen, preferably the middle halogens chloro or bromo.

Spirodilactams of a considerable variety of structures are therefore suitably employed as a precursor of the polycarbonate polymers of the invention. In the embodiment of the spirodilactam where Z is acyclic and not part of a cyclic structure, i.e., Z is

the spirodilactam is illustrated by 1,6-di(4-hydroxyphenyl)-1,6-diazaspiro[4.4]nonane-2,7-dione, 1,6-di(4-hydroxyphenyl)-3,4,8,9-tetrafluoro-1,6-diazaspiro[4.4]-nonane-,2,7-dione, 1,6-di(3-hydroxy-4-chlorophenyl)-3,3,4,4,8,8,9,9,-octamethyl-1,6-diazaspiro[4.4]nonane-2,7-dione, 1,6-di[4-(4'-hydroxybiphenyl)]-3,3-diphenyl-1,6-diazaspiro(4.4)nonane-2,7-dione, 1,6-di[2-(4-hydroxyphenyloxy)propyl]-1,6-diazaspiro[4.4]nonane-2,7-dione, and 1,6-di[4-(4-hydroxyphenylisopropyl)phenyl-1,6-diazaspiro[4.4]nonane-2,7-dione. In the embodiment of the spirodilactam wherein adjacent Z groups of the above formula I form a cyclic structure fused to the spiro rings, i.e., adjacent Z groups are Z", illustrative spirodilactams include 1,6-di(4-hydroxyphenyl)-3,4,8,9-dibenzo-1,6-diazaspiro[4.4]nonane-2,7-dione, 1,6-di[4-(4-hydroxyphenylthio)phenyl]-3,4,8,9-di(pyrido)-1,6-diazaspiro[4.4]nonane-2,7-dione. Also suitable are the spirodilactams wherein one spiro ring has a fused ring substituent and the other spiro ring is free from fused ring substituents, e.g., 1,6-di(4-hydroxyphenyl)-3,4-benzo-8-methyl-1,6-diazaspiro[4.4]nonane-2,7-dione and 1,6-di[1-(4-hydroxynaphthyl)]-3,4-cyclopentano-1,6-diazaspiro[4.4]nonane-2,7-dione.

In general, the spirodilactams of the above formula I wherein each R and R' is aromatic and hydrocarbyl are preferred, particularly those compounds wherein each r is zero. The 1,6-di(hydroxyphenyl) spirodilactams are particularly preferred, especially the 1,6-di(4-hydroxyphenyl) spirodilactams. Within the spirodilactam portion of the molecule, those spirodilactams wherein both spiro rings are free of fused cyclic substituents are preferred as are spirodilactams wherein each spiro ring has a fused cyclic substituent. The 1,6-diazaspiro[4.4]nonane-2,7-diones are preferred members of the former class where as the 3,4,8,9-dibenzo-1,6diazaspiro[4.4]nonane-2,7-diones are preferred members of the latter class.

The hydroxyaryl-spirodilactams of the above formula I are described in greater detail and are claimed in copending U.S. patent application Ser. No. 245,618, filed Sept. 16, 1988, incorporated herein by reference. The general process comprises the reaction of a hydroxyaryl-containing primary amino compound and a spirodilactam precursor. In terms of the spirodilactam of formula I, the hydroxyaryl-containing primary amino compound is represented by the formula $$HO-R(-X-R')_r-NH_2 \quad (II)$$

wherein R, R', X and r have the previously stated meanings. The spirodilactam precursor is a 4-oxoheptanedioic acid compound or a 1,6-dioxaspiro-[4.4]nonane-2,7-dione. In terms of the spirodilactam of formula I, the 4-oxoheptanedioic acid compound is represented by the formula

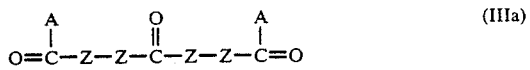

wherein A is hydroxy, lower alkoxy of up to 4 carbon atoms inclusive, or halo, preferably middle halo, and Z has the previously stated meaning. The spirodilactone precursor of the spirodilactam of formula I is represented by the formula

wherein Z has the previously stated meaning.

The acyclic 4-oxoheptanedioic acid compounds are known or are produced by known methods, but certain of the esters are produced by the process of U.S. Pat. No. 4,800,231. Interconversion of the esters, acids or acid halides is by conventional methods. The production of 4-oxoheptanedioic acid compounds which contain cyclic moieties is by the process of Cava et al, *J. Am. Chem. Soc.* 77, 6022 (1955). The spirodilactones of formula IIIb are produced by the methods of Pariza et al, *Synthetic Communications,* Vol. 13, pp. 243–254 (1983) or by the process of U.S. Pat. No. 1,999,181.

Reaction of the hydroxyaryl-containing primary amino compound and the spirodilactam precursor takes place in a liquid phase reaction environment in an inert reaction diluent such as an N-alkylamide, e.g., N,N-dimethylacetamide or N,N-dimethylformamide. The reactants are provided in a molar ratio of about 2:1 and reaction takes place at an elevated reaction temperature, for example, from about 80° C. to about 250° C., and a reaction pressure sufficient to maintain the reaction mixture in a liquid phase. Subsequent to reaction the hydroxyaryl-containing spirolactam-containing spirodilactam product is recovered from the product mixture by conventional methods such as solvent removal, precipitation or chromatographic techniques, or alternatively, is reacted further without separation.

The second bisphenol moiety in the polycarbonate polymers of the invention is derived from a di(hydroxyphenyl) compound of up to 30 carbon atoms. Although a considerable variety of such di(hydroxyphenyl) compounds are suitable for use as a precursor of the polycarbonate polymer, the preferred di(hydroxyphenyl) compounds are di(hydroxyphenyl)alkanes formula

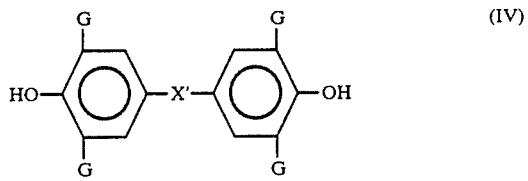

wherein G independently is halogen, alkyl, preferably lower alkyl, or halo, preferably the middle halogens, and X' is alkylene of up to 15 carbon atoms inclusive. Illustrative of the di(hydroxyphenyl)alkanes of formula IV are 2,2-di(4-hydroxyphenyl)propane, di(4-hydroxyphenyl)methane, 1,2-di(4-hydroxy-3-chlorophenyl)e- thane, 2,2-di(4-hydroxy-3,5-dibromophenyl)propane, 2-(4-hydroxyphenyl)-2-(4-hydroxy-3-methylphenyl)propane, 4,4-di(4-hydroxy-3-methyl-5-bromophenyl)octane and 2-(4-hydroxyphenl)-2-(4-hydroxy-3,5-dibromophenyl)propane. The preferred di(hydroxyphenyl)alkane is 2,2-di(4-hydroxyphenyl)propane.

The production of the polycarbonate polymer is easily accomplished by the conversion of one of the bisphenol precursors to a metal salt and the other bisphenol precursor to the di(chloroformate). Although other metal salts are useful in the production of the polycarbonate polymer, the preferred metal salts are alkali metal salts and particularly preferred are sodium salts or potassium salts. To produce the alkali metal salt, one bisphenol, e.g., either the hydroxyaryl-substituted spirodilactam or the di(hydroxyphenyl) compound, is reacted with an alkali metal source, such as the alkali metal hydroxide, carbonate, bicarbonate or amide. In one modification, the production of the alkali metal salt is conducted by contacting the bisphenol and the alkali metal source and removing by-products as by distillation. In a second modification, an aqueous solution of alkali metal source is vigorously agitated with the bisphenol to form the alkali metal salt. The di(chloroformate) of the other bisphenol is produced by the conventional phosgene method as described, for example, in U.S. Pat. Nos. 4,594,404, 4,601,858 and 4,638,077.

In terms of the spirodilactam of formula I, the spirodilactam derivative employed in the production of the polycarbonate polymer is represented by the formula

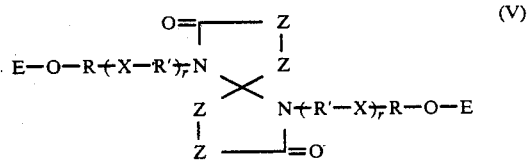

(V)

wherein R, R', r, X and Z have the previously stated meanings and E is alkali metal or chlorocarbonyl. The di(hydroxyphenyl) compound derivative is represented by the formula

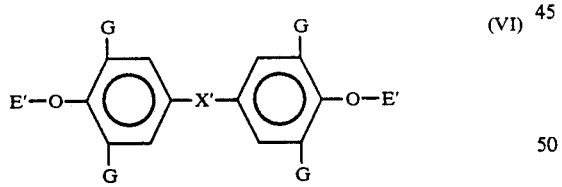

(VI)

wherein G and X' have the previously stated meaning and E' is alkali metal or chlorocarbonyl, with the proviso that one of E and E' is alkali metal and the other of E and E' is chlorocarbonyl. The bisphenol derivatives are contacted in an inert reaction diluent or diluent mixture at moderate temperature. In one modification the bisphenol derivatives are contacted in a mutual solvent and the reaction is homogeneous. In an alternate modification, the bisphenol derivatives are provided in immiscible diluents and the reaction, necessarily heterogeneous, is conducted with vigorous stirring, shaking or other agitation to provide reactant contact. The bisphenol derivatives are provided in any convenient ratio and molar ratios of the alkali metal derivative to the chloroformate derivative from about 5:1 to about 1:5 are satisfactory. The polymerization takes place in a 1:1 ratio of reactants and provision of the alkali metal derivative and the chloroformate derivative in a molar ratio that is substantially stoichiometric is preferred.

The reaction takes place under polymerization conditions in a liquid phase and best results are obtained if a small amount of a tertiary amine is added as a catalyst. Trialkylamines such as trimethylamine, triethylamine, dimethylbutylamine and trihexylamine are suitable for this purpose. Triethylamine is preferred, in part because of reasons of convenience. Other materials known as phase transfer agents such as tetraalkylammonium halides and tetraalkylphosphonium halides are useful for this purpose. Typical polymerization conditions include a temperature below about 80° C. and preferably below 30° C. and a pressure that will maintain the reaction mixture in a liquid phase. Pressures from about 0.8 atmosphere to about 5 atmospheres are suitable. The polycarbonate polymer is recovered by conventional methods from the resulting mixture, e.g., methods such as filtration, precipitation or chromatographic separation techniques.

The polycarbonate polymer is a linear polymer having a regular, alternating structure in which units of a 1,6-(oxyaryl)-1,6-diazaspiro[4.4]-nonane-2,7-dione alternate with units of a di(oxyphenyl) compound, with the units being separated by carbonyl groups. In terms of the spirodilactam of formula I, and the di(hydroxyphenyl) compound of formula IV, the polycarbonate polymer is depicted by alternating segments of

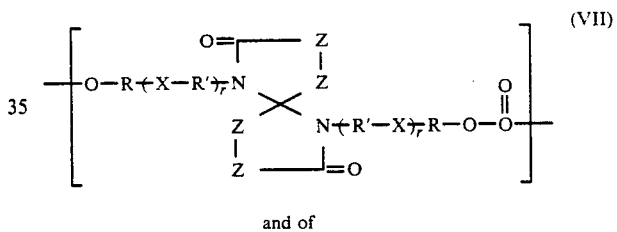

(VII)

and of

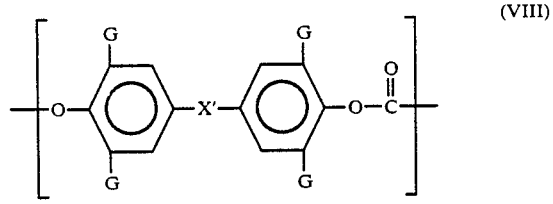

(VIII)

which segments are connected in a head-to-tail manner.

The nomenclature of the polycarbonate polymers is not easily determined because of the complexity thereof, but the identity of the regular alternating polymers will be apparent from consideration of the reactants (formulas I and IV) as depicted above and the alternating segments (formulas VII and VIII). By way of specific illustration is the polycarbonate polymer having alternating 1-(4-oxyphenyl)-6-(4-carboxyloxyphenyl)-1,6-diazaspiro[4.4]nonane-2,7-dione and 2-(4-oxyphenyl)-2-(4-carbonyloxyphenyl)propane units produced from 1,6-di(4-hydroxyphenyl)-1,6-diazaspiro[4.4-]nonane-2,7-dione and 2,2-di(4-chlorocarbonyloxyphenyl)-propane or from 1,6-di(4-chlorocarbonylphenyl)-1,6-diazaspiro[4.4]nonane-2,7-dione and 2,2-di(4-hydroxyphenyl)propane. Of particular interest are the polycarbonate polymers of the alternating units of the above formulas VII and VIII having a molecular weight from about 1,000 to about 100,000.

The polycarbonate polymers are thermoplastic and have utilities conventionally associated with thermoplastic polycarbonate polymers. The polymers are processed by the usual methods such as extrusion or injection molding into films, sheets and other articles of demonstrated utility. In addition, however, because of the regular, alternating structure of units the hydrolytic stability of the polycarbonate polymers is improved and the polymers are particularly suitable for applications where conditions of elevated temperature and relatively high humidity are likely to be encountered, e.g., as retortable containers for food and drink or for medical applications.

The invention is further illustrated by the following Illustrative Embodiment which should not be construed as limiting the invention.

ILLUSTRATIVE EMBODIMENT

A three-necked flask of 500 ml capacity equipped with a mechanical stirrer, a thermometer and a nitrogen inlet and outlet was charged ith 3.38 g (0.01 mole) of 1,6-di(4-hydroxyphenyl)-1,6-diazaspiro-[4.4]nonane-2,7-dione, 1.0 g (0.025 mole) of sodium hydroxide and 75 ml of distilled water. The reaction mixture was stirred at a motor speed of 1200 rpm under nitrogen at a temperature which did not exceed 25° C. A solution of 2,2-bis(4-chlorocarbonyloxyphenyl)propane, 3.52 g (0.01 mole) in 75 ml of chloroform was added over a period of 30 minutes. The reaction mixture was stirred for 5 minutes and 0.2 ml of triethylamine added while cooling maintained the temperature of the mixture at 25° C. The mixture was then maintained at 25° C. for 12 hours while stirring continued. The resulting mixture was then washed with hydrochloric acid and distilled water and added to methanol. A white polymer precipitated and was recovered by filtration. The glass transition temperature of the polymer was 143° C. and the nuclear magnetic resonance (NMR) spectra of the product were consistent with a linear alternating structure of 1,6-di(4-oxyphenyl)-1,6-diazaspiro-[4.4]-nonane-2,7-dione units and 2,2-di(4-oxyphenyl)propane units separated by carbonyl groups.

What is claimed is:

1. A polycarbonate polymer consisting essentially of regular, alternating moieties of (1) a 1,6-diaza [4.4] spirodilactam with oxyaryl-containing substituents on each spiro ring nitrogen atom and (2) a di(oxyphenyl) compound, the moieties being separated by carbonyl groups.

2. The polycarbonate polymer of claim 1 represented by alternating segments

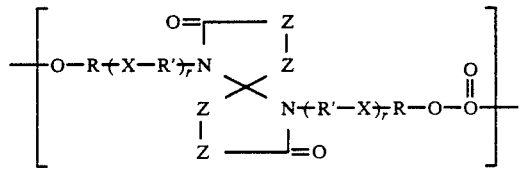

-continued
and

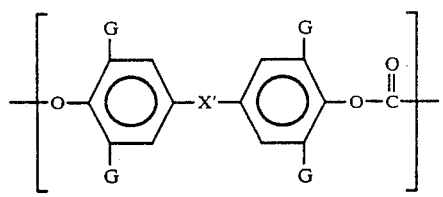

wherein R is aromatic of up to 15 carbon atoms and up to two aromatic rings, inclusive, R' is R or aliphatic of up to 10 carbon atoms inclusive, r is 0 or 1, X is a direct valence bond or X is alkylene of up to 15 carbon atoms inclusive, oxy, thio, sulfonyl, carbonyl, dioxyphenylene, 2,2-di(oxyphenyl)-propane, di(oxyphenyl)sulfone or dioxydiphenylene, Z independently is

in which Z' is hydrogen, lower alkyl, lower halo or phenyl, or Z is such that two adjacent Z groups taken together form a ring system Z" of from 5 to 7 ring atoms up to 2 of which are heteroatoms selected from nitrogen, oxygen or sulfur with the remainder of the ring atoms being carbon atoms, there being up to 15 carbon atoms in each Z", two of which form a bridge between the carbon atoms connected by the adjacent Z groups, X' is alkylene of up to 8 carbon atoms inclusive and G is hydrogen, lower alkyl or middle halo.

3. The polycarbonate polymer of claim 2 wherein R' is R.

4. The polycarbonate polymer of claim 3 wherein r is zero.

5. The polycarbonate polymer according to any one of claims 2, 3 or 4 wherein each Z is $>C(Z')_2$.

6. The polycarbonate polymer of claim 5 wherein Z' is hydrogen or methyl.

7. The polycarbonate polymer of claim 6 wherein G is hydrogen or bromo.

8. The polycarbonate polymer of claim 7 wherein R is phenylene.

9. The polycarbonate polymer of claim 8 wherein G is hydrogen.

10. The polycarbonate polymer of claim 9 wherein R is 4-phenylene.

11. The polycarbonate polymer of claim 10 wherein Z' is hydrogen.

12. The polycarbonate polymer according to any one claims 2, 3 or 4 wherein adjacent Z groups are Z".

13. The polycarbonate polymer of claim 12 wherein G is hydrogen or bromo.

14. The polycarbonate polymer of claim 13 wherein R is phenylene.

15. The polycarbonate polymer of claim 14 wherein Z" is benzo.

16. The polycarbonate polymer of claim 15 wherein R is 4-phenylene.

* * * * *